UNITED STATES PATENT OFFICE.

BENNO HOMOLKA, OF FRANKFORT-ON-THE-MAIN, AND NICOLAUS SCHWAN, OF HÖCHST-ON-THE-MAIN, GERMANY, ASSIGNORS TO FARBWERKE, VORM. MEISTER, LUCIUS & BRÜNING, OF HÖCHST-ON-THE-MAIN, GERMANY, A CORPORATION OF GERMANY.

PROCESS OF MAKING PHENYLAMIDOACETONITRILE.

SPECIFICATION forming part of Letters Patent No. 701,044, dated May 27, 1902.

Application filed October 26, 1901. Serial No. 80,038. (No specimens.)

*To all whom it may concern:*

Be it known that we, BENNO HOMOLKA, Ph. D., residing at Frankfort-on-the-Main, and NICOLAUS SCHWAN, Ph. D., residing at Höchst-on-the-Main, Germany, citizens of the Empire of Germany, have invented certain new and useful Improvements in the Manufacture of Phenylamidoacetonitrile and Homologues and Substitution Products Thereof, of which the following is a specification.

We have found that the nitrile of glycollic acid $(OH)-CH_2-CN$ reacts with anilin, its homologues, or substitution products with elimination of water and formation of phenylamidoacetonitrile, its homologues, or substitution products, the typical equation for the reaction being:

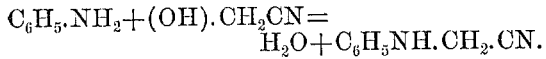
$$C_6H_5.NH_2+(OH).CH_2CN= \\ H_2O+C_6H_5NH.CH_2.CN.$$

This invention relates to the manufacture of phenylamidoacetonitrile and its homologues and substitution products by the foregoing reaction, which occurs slowly already at ordinary temperature, but rapidly and completely at a high temperature.

The following examples illustrate the process:

I. *Manufacture of phenylamidoacetonitrile.*—9.3 parts, by weight, of anilin are digested at water-bath temperature with 5.7 parts, by weight, of glycollic-acid nitrile in aqueous or aqueous-alcoholic solution till the anilin has disappeared, or the solution may be allowed to stand at ordinary temperature. After all the anilin has disappeared and any alcohol employed has been distilled off the phenylamidoacetonitrile separates as an oil, which soon solidifies. After recrystallization from a mixture of ether and ligroin it has the known melting-point of 42° to 43° centigrade and yields when hydrolyzed in the known manner phenylglycocol.

If in the above example the equivalent quantity of orthotoluidin is used instead of anilin, ortho-tolylamidoacetonitrile is obtained in the same manner, which on hydrolysis yields ortho-tolyl-glycin. In the same manner may be obtained with paratoluidin the known para-tolylamidoacetonitrile or therefrom the para-tolylglycin.

II. *Manufacture of phenylamidoacetonitrile-ortho-carboxylic acid.*—Sixteen parts, by weight, of sodium anthranilate are heated in aqueous or aqueous-alcoholic solution with 5.7 parts of glycollic-acid nitrile till the anthranilic acid has disappeared. After the reaction is complete (and after distilling off the alcohol, if used) the known phenylamidoacetonitrile-ortho-carboxylic acid is precipitated from the solution by a dilute acid. On hydrolysis in the well-known manner it yields phenylglycin-ortho-carboxylic acid.

Having now described our invention, what we claim is—

The herein-described process of making phenylamidoacetonitrile, which consists in causing glycollic-acid nitrile to act on anilin bases, substantially as set forth.

In testimony that we claim the foregoing as our invention we have signed our names in presence of two subscribing witnesses.

BENNO HOMOLKA.
NICOLAUS SCHWAN.

Witnesses:
ALFRED BRISBOIS,
BERNHARD LYDECKER.